United States Patent [19]

Gopinath et al.

[11] 3,963,905

[45] June 15, 1976

[54] PERIODIC SEQUENCE GENERATORS USING ORDINARY ARITHMETIC

[75] Inventors: Bhaskarpillai Gopinath, Berkeley Heights, N.J.; Robert Paul Kurshan, New York, N.Y.

[73] Assignee: Bell Telephone Laboratories, Incorporated, Murray Hill, N.J.

[22] Filed: May 2, 1975

[21] Appl. No.: 573,962

Related U.S. Application Data

[63] Continuation-in-part of Ser. No. 504,858, Sept. 11, 1974, abandoned.

[52] U.S. Cl. .................................... 235/152; 331/78
[51] Int. Cl.[2] ........................................... G06F 7/38
[58] Field of Search .............. 235/152, 197; 331/78; 328/37

[56] References Cited
UNITED STATES PATENTS

| | | | |
|---|---|---|---|
| 3,681,708 | 8/1972 | Olmstead | 331/78 |
| 3,700,869 | 10/1972 | Low et al. | 235/152 |
| 3,718,863 | 2/1973 | Fletcher | 328/37 |
| 3,740,591 | 6/1973 | Butler et al. | 307/295 |
| 3,761,696 | 9/1973 | Russell | 235/152 |
| 3,777,278 | 12/1973 | Majeau et al. | 331/78 |
| 3,780,275 | 12/1973 | Nakamura | 235/152 |
| 3,790,768 | 2/1974 | Chevalier et al. | 235/152 |
| 3,811,038 | 5/1974 | Reddaway | 235/152 |

Primary Examiner—Malcolm A. Morrison
Assistant Examiner—Jerry Smith
Attorney, Agent, or Firm—H. L. Logan; R. O. Nimtz

[57] ABSTRACT

Disclosed are signal generators for developing multilevel output signal sequences of a preselected period of repetition. In their general form, the generators comprise a shift register capable of storing multilevel signals, and feedback means. The feedback means multiply the output signal of prescribed shift register stages by selected integers, add the multiplied signals in nonmodulo arithmetic, and apply the added signals to the first stage of the shift register. The multiplying integers within the feedback means are selected to cause the characteristic functions of the signal generator to be a cyclotomic polynomial. For descriptive convenience, the disclosed generator is termed a "cyclotomic circuit." The disclosed cyclotomic circuits are particularly useful in a minimum memory, prescribed-period, signal generator applications. The minimum memory is achieved by separating the prescribed period into power-of-prime factors, and by associating with each factor a cyclotomic circuit. Each cyclotomic circuit develops a subsequence signal of a period equal to the power-of-prime factor, and the subsequence signals are combined in a transversal network, responsive to the cyclotomic circuits, to form the desired prescribed period sequence signal. Advantageously, the multiplying feedback integers of cyclotomic circuits of power-of-prime periods are limited to 0, 1, and −1.

16 Claims, 4 Drawing Figures

PERIODIC SEQUENCE GENERATORS USING ORDINARY ARITHMETIC

CROSS REFERENCE TO RELATED APPLICATION
latter disclosed

This application is a continuation-in-part of our copending application, Ser. No. 504,858, filed Sept. 17, 1974 and now abandoned.

BACKGROUND OF THE INVENTION

This invention relates to periodic sequence generators.

It is well known that two level pseudorandom (periodic) sequences may be achieved with logic circuits operating in modulo 2 arithmetic arranged in a feedback combination with binary shift registers. Multilevel pseudorandom sequences, however, are less common. Multilevel sequences may be achieved by grouping preselected portions of binary pseudorandom sequences, and by considering the groupings as representative of multilevel binary signals. Alternatively, a plurality of parallel binary shift registers may be used, and their output signals may be manipulated in modulo $2^N$ arithmetic (where N is the number of shift registers) to also form a multilevel output signal. The later approach is diclosed by Nakamura in U.S. Pat. No. 3,780,275 issued Dec. 18, 1973, for modulo $p^N$ arithmetic where $p$ is a prime number.

The above approaches to pseudorandom signal generation provide only a single maximum length sequence rather than a large number of prescribed sequences, and control of the waveform characteristics is nonexistent. Additionaly, the use of available memory by the above approaches is not necessarily optimal.

SUMMARY OF THE INVENTION

This invention relates to a class of multilevel circuits whose characteristic functions ae cyclotomic polynomials. Each circuit in this class, herein called a cyclotomic circuit, comprises a shift register capable of storing multilevel circuits, and feedback means. The feedback means includes means for multiplying by selected integers the output signal of predetermined stages of the shift register, and means for nonmodulo, or ordinary arithmetic, adding of the multiplied signals. The added signals are applied to the first stage of the shift register. The multiplying integers within the feedback means are selected to cause the characteristic function of the cyclotomic circuit to be a cyclotomic polynomial.

The term "nonmodulo" or "ordinary" arithmetic is used herein to distinguish from the term "modulo" arithmetic. In ordinary arithmetic, (6+8) =14, whereas in modulo 10 arithmetic, (6+8) = 4, because numbers above 9 do not exist. The use of nonmodulo arithmetic allows for the advantageous use of analog shift registers, e.g., CCD shift register, and permits the generation of a large number of sequences, which number is limited only by the noise level in the system and by the dynamic range.

Cyclotomic circuits are particularly useful in minimum memory, prescribed-period, signal generators. In implementing minimum memory signal generators, the prescribed period is separated into a plurality of power-of-prime factors. Corresponding to each power-of-prime factor, a cyclotomic circuit is used to develop a sequence having a period equal to the power-of-prime factor. The output signals of a plurality of cyclotomic circuits are combined in a transversal network to form the desired prescribed period sequence. The feedback coefficients of the cyclotomic circuits of power-of-prime periods are limited to 0, 1, and −1.

Cyclotomic circuits develop an output signal sequence of controllable amplitude characteristics. These characteristics are controlled by the initial conditions imposed on the shift registers and, in some embodiments, by a transversal network connected to the shift register stages of the cyclotomic circuits.

DETAILED DESCRIPTION

Figure 1:
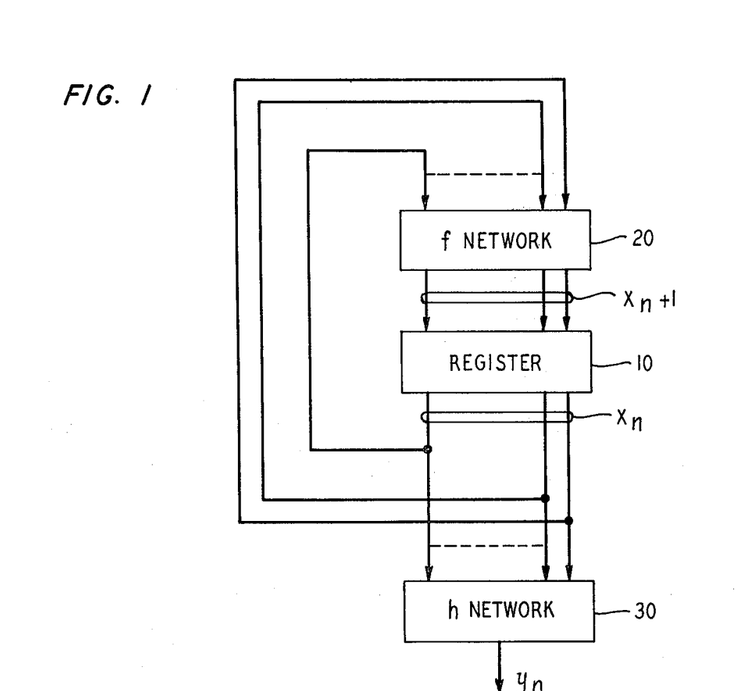
FIG. 1 depicts a general block diagram of a recursive system, providing a periodic output signal sequence $y_n$.

The block diagram of a system for generating a periodic sequence $y_n$ is illustrated in FIG. 1. Register 10, in its most general form, is a parallel-in-parallel-out analog register of $k$ stages. This is the memory of the system. The output signal of register 10 is an $x_n$ vector signal whose components denote the stages of the register at time $n$. The periodic sequence $y_n$ is produced by a transversal operation $h$ (in general, nonlinear) on $x_n$ in $h$ network 30. The next state of the memory, $x_{n+1}$, is generated in $f$ network 20 by operating on the signal vector $x_n$ with a vector function $f$, and by substituting $x_{n+1}$ for $x_n$ in register 10. The equations that mathematically describe the system of FIG. 1 are $$x_{n+1} = f(x_n) \tag{1}$$

and $$y_n = h(x_n) \tag{2}$$

The operator $f$ of equation (1) may be nonlinear, although for purposes of this invention, it is restricted to have a fixed point at 0 (i.e. $f(0) = 0$) and to be analytic in the neighborhood of 0.

For the sequence $x_n$ to be periodic, there must exist a smallest integer p such that $x_{n+p} = x_n$. This, of course, is one definition of periodicity. Since $x_{n+1} = f(x_n)$ by equation (1), $x_{n+p}$ may be rewritten as $x_{n+p} = f^p(x_n)$, where $f^p$ is a p-fold composition of $f$. This implies that $x_{n+p} = x_n = f^p(x_n)$, or that $f^p = I$, where I is the identity map. It can be said, therefore, that $f^p$ is p periodic, where periodicity is defined as the smallest integer $p$ which renders $f^p$ equal to the identify map I.

The linear term in the Taylor expansion of $f$, designated L, is called the linear part of $f$. It can be shown that replacing $f$ by L does not change the period of recursion, and that accordingly, nonlinearities in f cannot increase the period, or for a given period, nonlinearities in $f$ cannot reduce the required memory. For convenience and ease of implementation, therefore. $f$ is restricted to be a linear map L.

It can also be shown that for any desired period p (which can be represented by the canonical prime number decomposition $$p = \prod_{i=1}^{r} p_i^{\alpha_i}$$

the minimum required memory, k, is $$k = \sum_{i=1}^{r} \Phi(p_i^{\alpha_i}) - \delta \quad (3)$$

where $\delta = 1$ if the greatest common divisor of $p$ and 4 is equal to 2 (designated $(p,4)=2$), and where $\delta = 0$ otherwise. Equation (3) can also be expressed as $k = \Sigma k_i - \delta$, where $k_i = \phi(p_i^{\alpha_i})$. The Euler function $\phi(p_i^{\alpha_i})$ has a value equal to the number of positive integers which are less than and relatively prime to $p_i^{\alpha_i}$. In close form, it is known that $\phi(p_i^{\alpha_i})$ is equal to $(p_i^{\alpha_i - 1})(p-1)$.

From the above, given a period $p$, the minimum memory required for the implementation of the system of FIG. 1 can be computed. Table 1 depicts the required memory for periods ranging from 1 through 61. Table 2 depicts the maximum period obtainable for given memory size, ranging from $k=1$ to $k=50$. Table 2 is generated by searching through an expanded table 1 for the maximum period at each given memory size. For example, $k=8$ in table 1 corresponds to periods 16, 21, 28, 36, 40, 42, and 60. In fact, 60 is the maximum period achievable with memory $k=8$.

Table 1

| Period | Memory | Period | Memory |
|---|---|---|---|
| 1 | 1 | 31 | 30 |
| 2 | 1 | 32 | 16 |
| 3 | 2 | 33 | 12 |
| 4 | 2 | 34 | 16 |
| 5 | 4 | 35 | 10 |
| 6 | 2 | 36 | 8 |
| 7 | 6 | 37 | 36 |
| 8 | 4 | 38 | 18 |
| 9 | 6 | 39 | 14 |
| 10 | 4 | 40 | 8 |
| 11 | 10 | 41 | 40 |
| 12 | 4 | 42 | 8 |
| 13 | 12 | 43 | 42 |
| 14 | 6 | 44 | 12 |
| 15 | 6 | 45 | 10 |
| 16 | 8 | 46 | 22 |
| 17 | 16 | 47 | 46 |
| 18 | 6 | 48 | 10 |
| 19 | 18 | 49 | 42 |
| 20 | 6 | 50 | 20 |
| 21 | 8 | 51 | 18 |
| 22 | 10 | 52 | 14 |
| 23 | 22 | 53 | 52 |
| 24 | 6 | 54 | 18 |
| 25 | 20 | 55 | 14 |
| 26 | 12 | 56 | 10 |
| 27 | 18 | 57 | 20 |
| 28 | 8 | 58 | 28 |
| 29 | 28 | 59 | 58 |
| 30 | 6 | 60 | 8 |
|  |  | 61 | 60 |

Table 2

| Memory | Maximum Period |
|---|---|
| 1 | 2 |
| 2 | 6 |
| 4 | 12 |
| 6 | 30 |
| 8 | 60 |
| 10 | 120 |
| 12 | 210 |
| 14 | 420 |
| 16 | 840 |
| 18 | 1260 |
| 20 | 2520 |
| 24 | 5040 |
| 26 | 9240 |
| 28 | 13860 |
| 30 | 27720 |
| 32 | 32760 |
| 34 | 55440 |
| 36 | 65520 |
| 38 | 120120 |
| 40 | 180180 |
| 42 | 360360 |
| 46 | 720720 |
| 50 | 942480 |

In accordance with the principles of this invention, for the generation of sequences having a period $$p = \prod_{i=1}^{r} p_i^{\alpha_i},$$

$r$ independent subperiods must be generated and combined to form the period $p$ (with the only exception that $r-1$ subperiods are generated when $(p,4)=2$). Each subperiod $i$ is generated with an independant register $i$ of memory $k_i$ and an independent linear feedback network $L_i$. If $L_i$ is chosen to have the form $$L_i = \begin{bmatrix} 0 & 1 & \cdots & 0 & 0 & 0 \\ \cdot & \cdot & & \cdot & \cdot & \cdot \\ 0 & 0 & \cdots & 1 & 0 & 0 \\ 0 & 0 & \cdots & 0 & 1 & 0 \\ 0 & 0 & \cdots & 0 & 0 & 1 \\ \beta_{k_i}^i & \beta_{k_i-1}^i & \cdots & \beta_3^i & \beta_2^i & \beta_1^i \end{bmatrix} \quad (4)$$

where $x^i_{n+1} = L_i x^i_n$, and $x^i_{n+1}$ and $x^i_n$ are column vectors starting with the terms $(x^i_{n+1})_k$ and $(x^i_n)_k$ and decrementing to $(x^i_{n+1})_1$ and $(x^i_n)_1$, respectively, the following observations can be made.

A. $L_i$ represents the mapping of an $x^i_n$ vector (of a sequence of period $p_i^{\alpha_i}$) onto an $x^i_{n+1}$ vector wherein each component of $x^i_{n+1}$, except the last component, is derived from a single component of $x^i_n$. More specifically, $(x^i_{n+1})_j = (x^i_n)_{j-1}$ for all $k_i > j > 1$, while $$(x^i_{n+1})_1 = \beta^i_1(x^i_n)_1 + \beta^i_2(x^i_n)_2 + \beta^i_3(x^i_n)_3 + \ldots \beta^i_{k_i}(x^i_n)_{k_i} \quad (5)$$

B. This choice of $L_i$ greatly simplifies the circuitry since the parallel register of FIG. 1 can be substituted with a shift register which inherently provides the function $(x^i_{n+1})_j = (x^i_n)_{j-1}$  6

Figure 2:
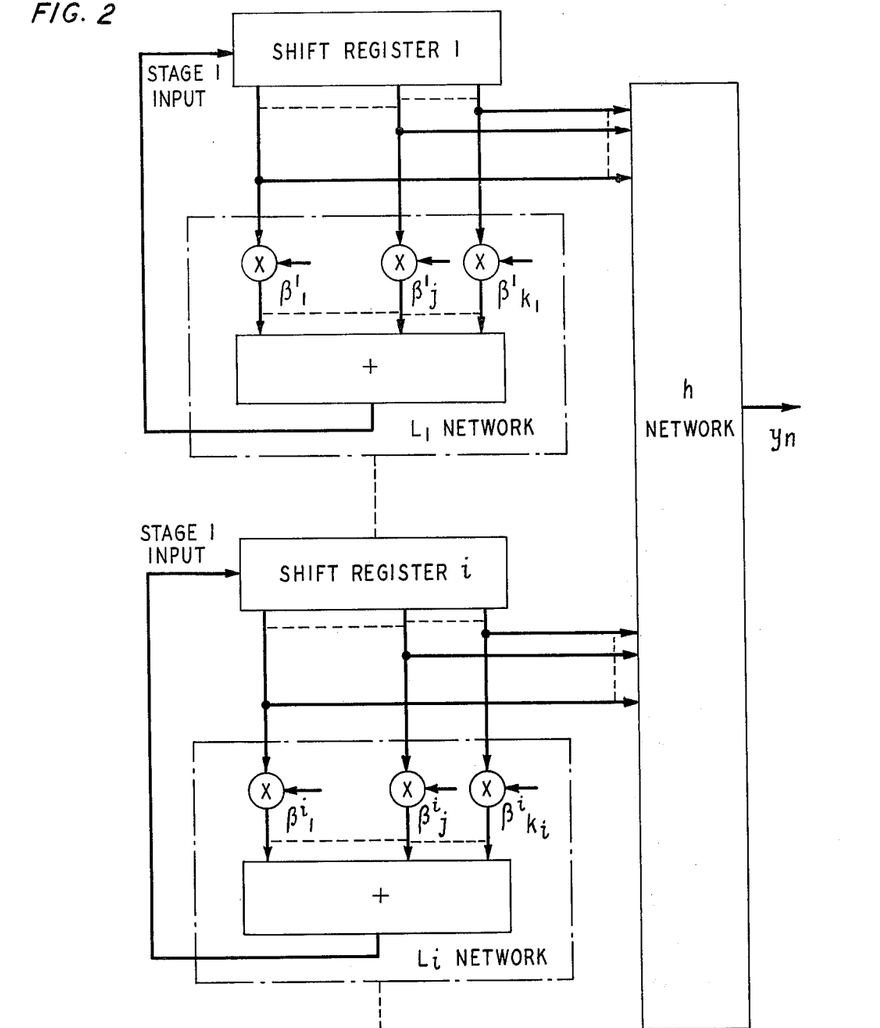
FIG. 2 depicts a block diagram of the apparatus of this invention.

C. The $(x^i_{n+1})_1$ vector component can be implemented in an $L_i$ feedback network connected to each shift register stage via a multiplication network multiplying each $(x^i_n)_j$ by a constant $\beta^i_j$ and an addition network performing the sum in accordance with equation (5). This arrangement is illustrated in FIG. 2, wherein the product signals $\beta^1_j(x^1_n)_j$ are summed in accordance with equation (5) and inserted into the first shift register's first stage, and the product signals $\beta^i_j(x^i_n)_j$ are summed in accordance with equation (5) and inserted into the $i$th register's first stage.

It can further be shown that if the coefficients $\beta^i_j$ are restricted to be integers then, necessary requirements on the roots of $\psi(\lambda)$ cause the determinant $L_i - \lambda I$ to be equal to the cyclotomic polynomial of order $p_i^{\alpha} i$, i.e., $$f(\lambda) = \lambda^k - \sum_{j=1}^{k} \beta_j \lambda^{k-j}. \quad (7)$$

Since all the coefficients of a cyclotomic polynomial of power-of-prime order are 0 or 1, all the $\beta$'s are either 0 or $-1$. In fact, it can be shown that every $(p_i^{\alpha_i - 1})^{th}$ tap, viewing the shift register in the direction of signal transfer, (left to right in FIG. 2), has a multiplicative factor $-1$, or a polarity reversal, and all other taps have a multiplicative factor 0.

The above is correct for all $p$ such that $(p,4) \neq 2$. If $(p,4) = 2$, the canonical prime number decomposition of $p$ must contain the factor $2^1$, in which case $p$ can be written $$2 \prod_{i=1}^{r-1} p_i^{\alpha_i}$$

and only $r-1$ registers are necessary for implementing the period $p$. The lone factor 2 may be combined with any one of the $p_i^{\alpha_i}$ terms and be implemented via an $L_i$ matrix whose characteristic polynomial is a cyclotomic polynomial of order $2p^{\alpha_i}$. The coefficients of a cyclotomic polynomial of order $2p^{\alpha_i}$ are $\pm 1$ or 0. As related to the hardware implementation, the particular $p_i^{\alpha_i}$ chosen to be combined with the factor 2 is constructed in exactly the same manner as if it were not combined, except that in the feedback path the signal of every odd nonzero tap is multiplied by $+1$ instead of $-1$.

The above derived cyclotomic polynomials and the resultant cyclotomic circuits are merely a specie of a class of circuits whose characteristic functions are cyclotomic polynomials. These circuits, herein called cyclotomic circuits are circuits having a shift register of a specified number of stages, integer feedback coefficients associated with each stage and multiplying the output signal of each stage, and a nonmodulo summer responsive to the integer multiplied signals impressing its output signal onto the first stage of the shift register. Cyclotomic circuits, in general, do not utilize minimum memory in their sequence generation without the above described power-of-prime decomposition. These circuits, however, have the distinct advantage over prior art circuits in that they always utilize integer coefficient factors. This allows for easy implementation and error free operation.

A cyclotomic ("circle-dividing") polynomial of order $m$, denoted $F_m(\lambda)$, is defined as a polynomial with integer coefficients, all of whose roots are primitive $m^{th}$ roots of unity (that is, $r^m = 1$, and $r^n \neq 1$ for $0 < n < m$). From this definition, it can be explicitly determined that $$F_m(\lambda) = \pi (\lambda - e^{j2\pi n \frac{d}{m}}) \quad (8)$$

where the product is taken over all $d$'s occurring in the range $1 \leq d < m$, such that d and m are relatively prime. The number of $d$'s determines the degree of the $F_m(\lambda)$ polynomial. The number of $d$'s within the range is found by evaluating the Euler function $\phi(m)$ and adding 1 to the result. The Euler function $\phi(m)$ is defined, in fact, as an integer equal to the number of positive integers less than or equal to $m$ and having no integer factors, other than 1, common to $m$ (such integers are said to be relatively prime to $m$). When $m$ is written as a product of powers of prime $$m = \prod_{k=1}^{N} p_k^{\alpha_k} \quad (9)$$

it can be shown that $$\phi(m) = \sum_{k=1}^{N} [p_k^{\alpha_k - 1}] [p_k - 1]. \quad (10)$$

For example, if $m = 30$, $\phi(m) = 7$ and thus, the number of numbers relatively prime to 30 is $7+1$, or 8. Indeed, the numbers that are relatively prime to 30 are 1, 7, 11, 13, 17, 19, 23, and 29. This list in fact contains exactly eight numbers. In view of equation (9), the function $F_m(\lambda)$ of equation (7) can be rewritten as $$F_m(\lambda) = \prod_{\nu=1}^{\rho(m)} [\lambda - \exp j(2\pi d_\nu/m)]. \quad (11)$$

For $m = 30$, equation (11) can be rewritten as, $$F_{30}(\lambda) = (\lambda - e^{\frac{j2\pi}{30}})(\lambda - e^{\frac{j2\pi 7}{30}})(\lambda - e^{\frac{j2\pi 11}{30}})(\lambda - e^{\frac{j2\pi 13}{30}})$$
$$(\lambda - e^{\frac{j2\pi 29}{30}})(\lambda - e^{\frac{j2\pi 23}{30}})(\lambda - e^{\frac{j2\pi 19}{30}})(\lambda - e^{\frac{j2\pi 17}{30}}). \quad (12)$$

Note that all roots appear in complex conjugate pairs, i.e.

$$e^{\frac{j2\pi 29}{30}} = e^{\frac{-j2\pi}{30}},$$

which is the complex conjugate of $$e^{\frac{j2\pi}{30}}.$$

Conversion of equation (12) to cartesian coordinates yield $$F_{30}(\lambda) = \lambda^8 + \lambda^7 - \lambda^5 - \lambda^4 - \lambda^3 + \lambda + 1 \quad (13)$$

with the expected real integer coefficients. Interestingly, all the nonzero coefficients of $F(\lambda)$ in equation (13) are either $+1$, $-1$, or zero. These coefficients correspond to the $\beta_j$ coefficients of equations (5) and (7). Thus, an order 30 cyclotomic circuit, though not of minimum memory, can be implemented with a single shift register (of length 8) and a single $L_j$ network of the type shown in FIG. 2. Specifically, correlating equations (7) and (13), in the $L_1$ network of FIG. 2 $\beta_1 = -1, \beta_2 = 0, \beta_3 = 1, \beta_4 = 1, \beta_5 = 1, \beta_6 = 0, \beta_7 = 1$ and $\beta_8 = -1$.

As illustrated by the above example, cyclotomic polynomials, happily, make very desirable characteristic polynomials because of their extreme simplicity. For example, for $k < 105$, or for a $k$ that is a product of two prime numbers, the coefficients of $F(\lambda)$ are all 0 or $\pm 1$. For a $k$ that is a power of a single prime, the coefficients are all 0 and $+1$; and for $k < 385$, the coefficients do not exceed 2 in absolute value. This means, of course, that in all cases of practical interest, the feedback coefficients of network 20 in FIG. 1 will be 0 and $\pm 1$; which means that there is either no connection, a direct connection or a negative connection.

Equation (2), supra, defines the operation h which transforms the multilevel *vector* signal $x_n$ to a multilevel *scalar* signal $y_n$. The use of the h operator also allows for the shaping of nonlinearities into the output signal $y_n$ in order to satisfy other conditions, such as the fit of $y_n$ to a desired norm, the spreading of the energy of the output signal in the frequency domain, etc.

Periodicity of the output signal is guaranteed, of course, independent of $h$, by the periodicity of the sequence $x_n$. The only requirement on $h$, therefore, is that it not *decrease* the period of the recursion. It can be shown that a sufficient condition on h for preserving the period $p$ is that the linear part of $h$ preserves the period of $x_n$. It can further be shown that this condition is satisfied if h is made a function of a single output from each of the shift registers which generate the sequences of relatively prime periods. Since the sequences generated by the shift registers of FIG. 2 are relatively prime, having been designed in accordance with the prime number decomposition of the period $p$, the h function of FIG. 2 need be responsive to only single outputs of each of the shift registers of FIG. 2 to produce no reduction in the output signal's period.

Figure 3:
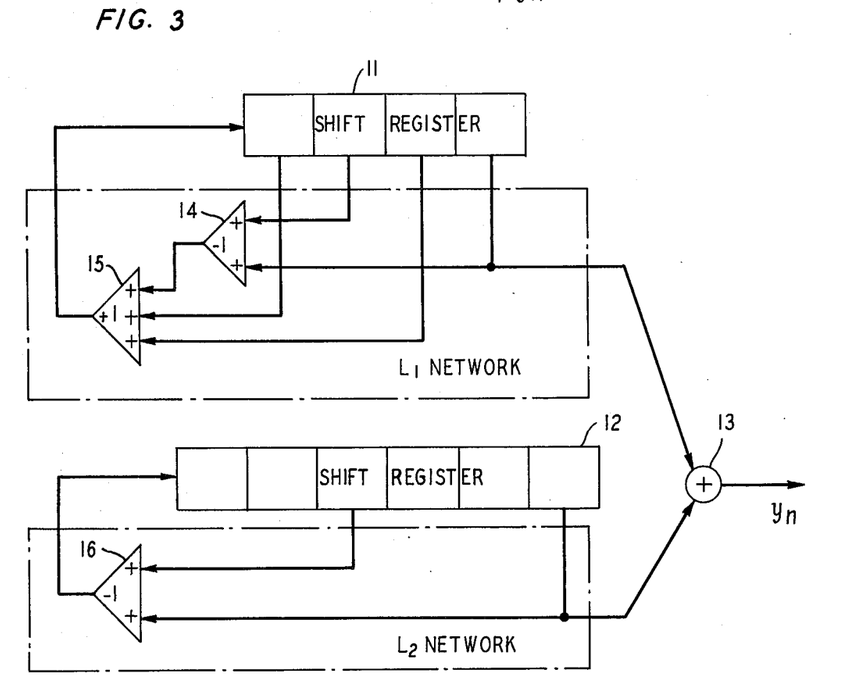
FIG. 3 illustrates the particular interconnections for the apparatus of FIG. 2 designed to provide a period of 90.

FIG. 3 illustrates the sequence generator of this invention for a period $p=90$. Shift register 11 generates the period $(2)(5)$, while shift register 12 generates the period $3^2$. The h function chosen is simply the sum function of a single output of the registers 11 and 12. As has been indicated, supra, the utilization of only a single output from each register assures that the transversal network h will not reduce the period p.

In accordance with this invention, the number of stages required for shift register 11 is $(5^{1-1})(5-1)$, or 4. Every $5^{1-1}$, or $1^{th}$, tap is nonzero, and since the period has a multiplicative factor 2, every odd nonzero tap (counting in the direction of signal flow) has a $+1$ multiplicative factor, while every even nonzero tap has a $-1$ multiplicative factor. This feedback arrangement is illustrated in FIG. 3 with two summers; an inverting (polarity reversing) summer 14 connected to taps 2 and 4 of register 11 and a noninverting summer 15 connected to taps 1 and 3 of register 11 and to the output port of summer 14. The output signal of summer 15 is applied to the input port of register 11.

The number of stages in shift register 12 is $(3^{2-1})(3-1)$, or 6, and every $3^{2-1}$, or $3^{rd}$, tap has a $-1$ multiplicative factor. Accordingly, in the illustration of FIG. 3, an inverting (polarity reversing) summer 16 is connected and made responsive to taps 3 and 6 of register 12, and the output signal of summer 16 is applied to the input port of register 12. The output signals of registers 11 and 12 are connected to analog adder 13 which combines the output signals of register 11 and 12 to develop the desired sequence of period 90.

In addition to the displayed capability of generating a signal sequence of any desirable period, it can also be shown that the apparatus of this invention may be arranged to provide both a desirable sequence period and a specific amplitude sequence. In concept, this capability is easily realizable via the h function, because with any chosen initial state for the generator, a particular sequence of period $p$ is developed; and from the developed sequence, the desired sequence can be derived from an h network comprising a read-only memory of large enough storage. In practice, however this brute force technique is unattractive because the resultant h network would be extremely complex, large, and expensive, and because any changes in the desired sequence would entail drastic changes in the h network. It can be shown, that even with a restricted h function which simply comprises the sum of single outputs of the independent registers in the sequence generator, an innumerable number of sequences can be generated by judiciously controlling the initial state of the sequence generator. Not all possible sequences are generatable in this manner because in order to generate all sequences of length $p$, $p^\circ$ of freedom are necessary, whereas the available memory in the sequence generator of this invention offers only $k$ degrees of freedom. However, it can shown that for a given desired sequence w of length $p$, a best approximation $\widehat{w}$ (in the least square sense) can be realized by controlling the initial conditions in the following manner.

1. Having a memory of length $k$, generate a set of k orthonormal unit vectors, $d_u$, forming an orthonormal basis and defining a linear space.
2. Compute the projection of w on the space defined by the set of $d_u$ vectors by computing the normal inner products of w with each of the $d_u$ vectors, i.e., compute $<w,d_u>$ for $u=1,2\ldots k$.
3. Define $\widehat{w}$ as $$\sum_{u=1}^{k} <w,d_u>d_u .$$

For purposes of clarity, the immediately following description depicting the generation of an orthonormal basis is limited to a period p which is a single power of a prime number, i.e., $p=q^r$.

It has been shown, supra, that when $p=q^r$, the L matrix has $k$ distinct roots $\rho_n$, where $k=(q^{r-1})(q-1)$, and that these roots are the primitive roots of unity of the cyclotomic polynomial of order $q^r$. It can be shown that vectors generated from powers of different roots are orthogonal, i.e., $(\rho^1_i, \rho^2_i, \rho^3_i \ldots \rho^p_i)$ is orthogonal to $(\rho^1_j, \rho^2_j, \rho^3_j \ldots \rho^p_j)$ when $i \neq j$, and that the set of vectors $1/p\,(\rho^1_n, \rho^2_n, \rho^3_n \ldots \rho^p_n)$ for $n=1,2,3,\ldots k$ forms a valid orthonormal basis.

Another orthonormal basis can be derived from sequences of length p generated by inserting the following set of initial conditions in the shift register of the sequence generator

| Vector No | Shift Reg. Loc. | 1 | 2 | 3 | ... | k |
|---|---|---|---|---|---|---|
| 1 | | 1 | 0 | 0 | ... | 0 |
| 2 | | 0 | 1 | 0 | ... | 0 |

| Vector No | Shift Reg. Loc. | 1 | 2 | 3 | ... | k |
|---|---|---|---|---|---|---|
| 3 | | 0 | 0 | 1 | ... | 0 |
| k | | 0 | 0 | 0 | ... | 1 |

It can be shown that this generated set of $k$ sequences can be orthonormalized by the Graham-Schmitt orthonormalization procedure and that the resultant orthonormal basis $b_n$ defines the same linear space defined by the $d_n$ basis. Since $b_n$ and $d_n$ define the same linear space, it can be shown that for a given desired sequence $\bar{w}$, the best approximation sequence $w$ can be generated by computing $$\bar{w} = \sum_{u=1}^{k} <w,b_u>b_u \qquad (14)$$

For purposes of illustration, the use of the above method is described for a sequence generator having a period 5 where the desired sequence is $(-5, 0, 4, 2, -1)$.

In accordance with the principles of this invention, the sequence generator of period 5 has 4 stages. The 4 initial conditions are $$\begin{matrix} 1,0,0,0 \\ 0,1,0,0 \\ 0,0,1,0 \\ 0,0,0,1 \end{matrix}$$

and the resultant 4 sequences of length 5 are $$\begin{matrix} 1,0,0,0,-1 \\ 0,1,0,0,-1 \\ 0,0,1,0,-1 \\ 0,0,0,1,-1 \end{matrix}$$

Using the Graham-Schmitt orthonormalization procedure, the resultant orthonormal basis is $b_1 = \frac{1}{2}(1, 0, 0, 0, -1)$
$b_2 = 1/6 (-1, 2, 0, 0, -1)$
$b_3 = 1/12 (-1, -1, 3, 0, -1)$
$b_4 = 1/20 (-1, -1, -1, 4, -1)$.

Thus,
$<w,b_1> = -4/2$
$<w,b_2> = 6/6$
$<w,b_3> = 18/12$
$<w,b_4> = 10/20$ and $$\bar{w} = -\frac{4}{2}b_1 + \frac{6}{6}b_2 + \frac{18}{12}b_3 + \frac{10}{20}b_4 ,$$

or $\bar{w} = (-2, 0, 0, 0, +2) +$
$(-1, 2, 0, 0, -1) +$
$(-18/12, -18/12, 54/12, 0, -18/12) +$
$(-1/2, -1/2, -1/2, 2, -1/2)$ The initial conditions, therefore, are the first $k$ components of $\bar{w}$, in this instance $(-5, 0, 4, 2,)$. These initial conditions yield the sequence $\bar{w} = (-5, 0, 4, 2, -1)$, which in this case is exactly equal to $w$.

The above procedure for $p = q^r$ may be generalized $$p = \prod_{i=1}^{r} p_i^{\alpha_i} ,$$

when it is realized that the orthonormal basis for one register generated by its $\rho$ vectors (which are the $(p_i^{\alpha_i})$th roots of unity) is orthogonal to the orthonormal basis for another register generated by its $\rho$ vectors (which are the $(p_j^{\alpha_i})$th roots of unity). Similar results can be shown to be true for orthonormal bases composed of $b_u$ vectors generated in the same manner as in the $p = q^r$ case.

Thus, when $$p = \prod_{i=1}^{r} p_i^{\alpha_i}$$

each of the $r$ (or $r-1$) registers has $k_i$ stages of memory, and $r$ (or $r-1$) independent orthonormal bases must be generated, with each basis having $k_i$ vectors. The remainder of the procedure is the same as for $p = q^r$ cases. Namely, compute the factors $<w,b_u>$ and construct the approximated function $$\bar{w} = \sum_{\text{for 1st register}} <w,b_u>b_u + \sum_{\text{for 2nd register}} <w,b_u>b_u + \ldots r \text{ times}.$$

For example, if a sequence generator is constructed to provide a period of 12, and if it is further desired that the output sequence be $\bar{w} = (1, -1, 0, 2, -2, -1, 3, -1, -2, +2, 0, -1)$, it can be shown that the generator will comprise two registers of length 2, one (register A) connected to develop a period 3 and the other (register B) connected to develop a period 4. The orthonormal basis of register A may be derived from the initial conditions 10 and 01 which yield the sequences $1, 0, -1, +1, 0, -1, 1, 0, -1, 1, 0, -1$
and
$0, 1, -1, 0, 1, -1, 0, 1, -1, 0, 1, -1$ Thus, $b_1 = \frac{1}{8}(1, 0, -1, 1, 0, -1, 1, 0, -1, 1, 0, -1)$ and $b_2 = 1/24 (-1, 2, -1, -1, 2, -1, -1, 2, -1, -1, 2, -1)$ The orthonormal basis of register B is $b_3 = 1/6 (1, 0, -1, 0, 1, 0, -1, 0, 1, 0, -1, 0)$ and $b_4 = 1/16 (0, 1, 0, -1, 0, 1, 0, -1, 0, 1, 0, -1)$ From the above, the inner products $<w,b_u>$ can be computed, which when carried out, results in $\bar{w} = 12/8 (1, 0, -1, 1, 0, -1, 1, 0, -1, 1, 0, -1) +$
$-12/24 (-1, 2, -1, -1, 2, -1, -1, 2, -1, -1, 2, -1)$
$+$
$-6/6 (1, 0, -1, 0, 1, 0, -1, 0, 1, 0, -1, 0)+$
$0 (0, 1, 0, -1, 0, 1, 0, -1, 0, 1, 0, -1)$ or $\bar{w} = (2, -1, -1, \ldots) + (-1, 0, +1, \ldots)$ The above indicates that the initial condition for register A is +2 and −1 and the initial condition for register B is −1 and 0. Carrying out the computation, it can be seen that in this example w̃ is exactly equal to w.

Figure 4:
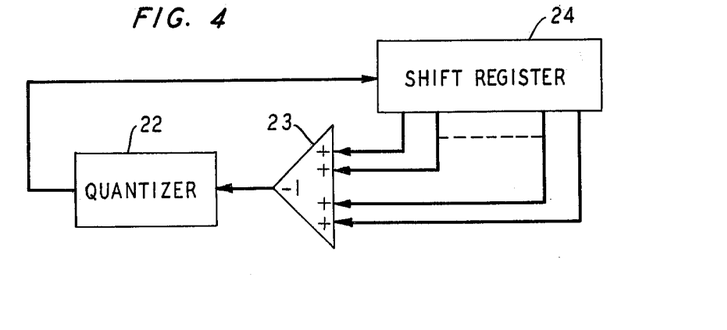
FIG. 4 illustrates one use of a quantizer element to compensate for the nonidealness in the operation of the elements of FIG. 2.

The above discussion has been limited, until now, to ideal analog shift registers, in the sense that no errors have been assumed to exist. In a physical implementation of the sequence generator of this invention, errors will be introduced by interstage transmission losses within the shift register and by gain variations in the feedback amplifier. The problems raised by the nonidealness of such practical systems are not critical in many applications, but in applications where idealness is critical a skilled artisan can easily resolve the problems associated therewith. However, for the sake of completeness, FIG. 4 is presented to illustrate one way of overcoming the loss problem. Therein, a quantizer 22 is interposed between the summing gain unit 23 and register 24. The quantizer must be a staircase quantizer which is sensitized to resolve and quantize all the levels that are expected to be encountered in the operation of the generator. Quantizer 22 may comprise, for example a plurality of voltage comparators which one input of each connected to summing unit 23 and the other input of each connected to the various desired quantizer threshold voltages. The output currents of the voltage comparators may be summed and applied to a resistor to provide the necessary staircase quantization function.

It is understood, of course that the embodiments shown and disclosed herein are only illustrative of the principles of this invention, and that modifications may be implemented by those skilled in the art without departing from the spirit and scope of the invention. For example, although the virtues and advantages of the subject apparatus have been associated with analog shift registers, in any particular application where, subject to known initial conditions, the maximum value for the output sequence is known, a bank of shift registers, somewhat akin to those used by the aforementioned Nakamura patent, may be used, thereby eliminating the need for a quantizer. Also, although a particular signal of the disclosed embodiments has been described, it is to be understood that any avilable signal in the disclosed embodiments can serve as the output signals, since that signal would differ from the described signal only be a time delay and, possibly, by a multiplicative constant.

What is claimed is:

1. A circuit comprising:
   a shift register;
   means for multiplying the output signals of selected stages of said shift register by predetermined integers to cause the characteristic function of said circuit to be a cyclotomic polynomial;
   means for forming a non-modulo sum signal of said integer multiplied signals; and
   means for applying said sum signal to the first stage of said shift register.

2. A circuit comprising:
   a shift register of $k$ stages having at least one of said $k$ stages at a nonzero initial condition;
   means for forming product signals $\beta_j(x_n)_j$ where $(x_n)_j$ is the output signal of the $j^{th}$ stage of said shift register at time $n$ and $\beta_j$ is a predetermined multiplicative integer associated with the $j^{th}$ stage of said shift register, such that for a function variable $\lambda$, the function $$f(\lambda) = \lambda^k - \sum_{j=1}^{k} \beta_j \lambda^{k-j}$$

is a cyclotomic polynomial;
   means for adding said product signals to form a signal $$x_{n-1} = \sum_{j=1}^{k} \beta_j (x_n)_j \; ;$$

and
   means for applying said $x_{n+1}$ signal to the first stage of said shift register.

3. A multilevel sequence generator comprising:
   an analog shift register of k stages; and
   feedback means interposed between selected stages of said shift register and the first stage of said shift register for developing a multilevel nonmodula negative sum of the multilevel output signals of said selected stages as an input signal to said first stage of said shift register.

4. The sequence generator of claim 3 wherein said feedback means develops said nonmodula negative sum in ordinary arithmetic.

5. The sequence generator of claim 3 wherein said feedback means comprises means for quantizing said multilevel input signal to said first stage to preselected signal levels.

6. A multilevel signal generator comprising:
   a shift register;
   means for multiplying the output signals of preselected stages of said shift register by −1 where said preselected stages are chosen to provide a characteristic function for said signal generator that is a cyclotomic polynomial;
   means for adding said multiplied signals in nonmodulo arithmetic; and
   means for applying the output signal of said means for adding to the first stage of said shift register.

7. A multilevel signal generator comprising:
   a shift register;
   first means for reversing the output signal polarity of a first set of preselected stages of said shift register;
   means for adding said polarity reversed signals and the output signals of a second set of preselected stages of said shift register in nonmodulo arithmetic; and
   means for applying the output signal of said means for adding to the first stage of said shift register.

8. A sequence generator, responsive to a clock signal, providing an output signal of period $q^r$, where $q$ is a prime number and $v$ is a positive integer comprising:
   a shift register having $(q^{r-1})(q-1)$ stages, in which the signal of the $(i)$th stage transfers to the $(i+1)$th stage at the occurrence of said clock signal;
   means for reversing the output signal polarity of each $(q^{r-1})$th stage of said shift register;
   means for adding said polarity reversed signals; and
   means for applying the output signal of said means for adding to the first stage of said shift register.

9. A multilevel analog sequence generator, responsive to a clock signal and providing a sequence of period $q^r$, where $q$ is a prime number and v is a positive integer comprising:
- a shift register having $(q^{r-1})(q-1)$ stages where the signal of the register's ($i$)th stage is transferred to the register's ($i$+1)th stage at the occurrence of said clock signal;
- means for summing the output signal of each $(q^{r-1})$th stage of said shift register; and
- means interposed between said means for summing and the first stage of said shift register for reversing the polarity of the output signal of said means for adding.

10. A sequence generator responsive to a clock signal providing a sequence of period $q^r$, where $q$ is a prime number and $v$ is a positive integer comprising:
- a shift register having $(q^{r-1})(q-1)$ stages;
- means for reversing the output signal polarity of stages counted in the direction of signal flow which are multiples of $q^{r-1}$ to provide feedback signals; and
- means interposed between said means for polarity reversing and the first stage of said shift register for summing said feedback signals and applying the sum thereof to said 1st stage.

11. A sequence generator responsive to a clock signal providing a sequence of period $2q^r$ where $q$ is a prime number and v is a positive integer comprising:
- a shift register having $(q^{r-1})(q-1)$ stages where the signal of the ($i$)th stage is transferred to the ($i$+1)th stage at the occurrence of said clock signal;
- means for reversing the output signal polarity of stages which are multiples of $2(Q^{r-1})$ to provide feedback signals;
- means for adding said feedback signals and the output signal of stages which are odd multiples of $(q^{r-1})$; and
- means for applying the output signal of said means for adding to the first stage of said shift register.

12. A sequence generator comprising:
- an analog shift register;
- feedback means connected to chosen stages of said shift register for combining the output signals of said chosen stages to form a negative nonmodulo sum thereof and for applying the combined signal to the first stage of said shift register; and
- a transversal network connected to preselected stages of said analog shift register for providing an output sequence that corresponds to a combination of the output signals of said preselected shift register stages.

13. A signal generator providing a multilevel output sequence of period p, where p is a product of powers of prime numbers, comprising:
- a plurality of subsequence generators, each corresponding to one of said powers of prime numbers and developing a signal subsequent of length equal to its corresponding power of prime number comprising;
  A. a shift register;
  B. means for adding the output signal of selected stages of said shift register; and
  C. means interposed between said means for adding and the first stage of said shift register for reversing the polarity of the output signal of said means for adding; and
- a transversal network responsive to selected stages of each of said subsequence generators for providing said multilevel output sequence of period p.

14. The signal generator of claim 13 wherein said shift register is an analog shift register.

15. A signal generator providing a multilevel output sequence of period p, where $(p,4) \neq 2$ and where p is $$\prod_{i=1}^{r} (p_i^{\alpha_i}),$$

where $p_i$ are prime numbers and $\alpha_i$ and r are positive integers comprising:
- r subsequence generators, each corresponding to a $p_i^{\alpha_i}$ term, comprising:
  A. a shift register having $(p_i^{\alpha_i\ -1})(p_i-1)$ stages;
  B. means for adding the output signals of stages which correspond to multiples of $(p_i^{\alpha_i\ -1})$; and
  C. means interposed between said means for adding and the first stage of said shift register for reversing the polarity of the output signal of said means for adding; and
- a transversal network responsive to selected stages of each of said subsequent generators for providing a multilevel output signal that corresponds to a combination of the signals of said selected stages.

16. A signal generator providing a multilevel output sequence of period p which equals $$2 \prod_{i=1}^{r} (p_i^{\alpha_i}),$$

where $p_i$ are prime numbers and $\alpha_i$ and r are positive integers comprising:
- $r$–1 subsequence generators, each corresponding to a $p_i^{\alpha_i}$ other than $i$=1 comprising:
  A. a shift register having $(p_i^{\alpha_i\ -1})(p_i-1)$ stages;
  B. means for adding the output signals of stages which correspond to multiples of $(p_i^{\alpha_i\ -1})$; and
  C. means interposed between said means for adding and the first stage of said shift register for negating the output signal of said means for adding;
- an $r^{th}$ subsequence generator comprising:
  A. an $r^{th}$ shift register having $(p_1^{\alpha_i\ -1})(p_1-1)$ stages;
  B. $r^{th}$ means for reversing the output polarity of stage numbers which are multiples of $2(p_1^{\alpha_i\ -1})$ to provide feedback signals;
  C. $r^{th}$ means for adding said feedback signals and the output signal of stages of said $r^{th}$ shift register which are odd multiples of $(p_1^{\alpha_i\ -1})$; and
  D. means for applying the output signal of said $r^{th}$ means for adding to the first stage of said $r^{th}$ shift register; and
- a transversal network responsive to selected stages of each of said subsequence generators for providing a multilevel output signal that corresponds to a linear combination of the signals of said selected stages.

* * * * *

UNITED STATES PATENT AND TRADEMARK OFFICE
CERTIFICATE OF CORRECTION

PATENT NO. : 3,963,905
DATED : June 15, 1976
INVENTOR(S) : Bhaskarpillai Gopinath and Robert P. Kurshan It is certified that error appears in the above-identified patent and that said Letters Patent are hereby corrected as shown below:

Column 1, line 5, delete "latter disclosed"; line 8, "Sept. 17" should read --Sept. 11--; line 9, delete "and now abandoned"; line 38, "ae" should read --are--; lines 40 and 41, insert quotes around "cyclotomic circuit,". Column 2, line 32, "stages" should read --states--; line 57, "identify" should read --identity--. Column 4, line 35 the equation reading "$(x^i_{n+1})_k$" and "$(x^i_n)_k$" should read --$(x^i_{n+1})_{k_i}$-- and --$(x^i_n)_{k_i}$--; line 45 should read $$(x^i_{n+1})_1 = \beta^i_1(x^i_n)_1 + \beta^i_2(x^i_n)_2 + \beta^i_3(x^i_n)_3 + \ldots \beta^i_{k_i}(x^i_n)_{k_i}$$

line 48, underscore "parallel"; line 49, underscore "shift". Column 5, lines 26 and 27, "$2p^{\alpha i}$" should read --$2p^\alpha$--; delete equation 8 at end of column 5 and at beginning of column 6 and rewrite as --$F_m(\lambda) = \Pi(\lambda - e^{j2\pi\frac{d}{m}})$--. Column 7, line 63, "a" should not be in italics. Column 8, line 26, "p°" should be --p degrees--; line 51, that portion of the equation reading "1/p" should read --$\sqrt{1/p}$--. Column 9, line 15, "$\hat{w}$" should be --w--, and "w" should be --w--; lines 44 through 46, that portion of the equation reading

| 1/2 | should read | $\sqrt{1/2}$ |
| 1/6 | should read | $\sqrt{1/6}$ |
| 1/12 | should read | $\sqrt{1/12}$ |
| 1/20 | should read | $\sqrt{1/20}$ | lines 48-50, that portion of the equation reading

-4/2 should read $-4/\sqrt{2}$

UNITED STATES PATENT AND TRADEMARK OFFICE
CERTIFICATE OF CORRECTION

PATENT NO. : 3,963,905
DATED : June 15, 1976
INVENTOR(S) : Bhaskarpillai Gopinath and Robert P. Kurshan It is certified that error appears in the above-identified patent and that said Letters Patent are hereby corrected as shown below:

$6/6$ should read $6/\sqrt{6}$ $18/12$ should read $18/\sqrt{12}$ $10/20$ should read $10/\sqrt{20}$ rewrite line 54 to read $$\hat{w} = -\frac{4}{\sqrt{2}} b_1 + \frac{6}{\sqrt{6}} b_2 + \frac{18}{\sqrt{12}} b_3 + \frac{10}{\sqrt{20}} b_4$$

line 65, after "generalized" insert --to any period--; line 67, that portion of the equation reading $$p = \pi \ p_i^{\alpha_i} \quad \text{should read} \quad p = \prod_{i=1}^{r} p_i^{\alpha_i}.$$

Column 10, lines 1-3, delete in its entirety; line 9, "$(p_j^{\alpha_i})$" should be --$(p_j^{\alpha_j})$--; line 16, "$\pi$" should read --$\Pi$--; line 34, "$\hat{w}$" should be --w--; line 45, "1/8" should be -- $\sqrt{1/8}$ --; line 50, "1/24" should be -- $\sqrt{1/24}$ --; line 52, "1/6" should be -- $\sqrt{1/6}$ --; line 56, "1/16" should be -- $\sqrt{1/16}$ --.
Column 11, line 4, "w" should read --w--; line 23, "which" should read --with--. Column 12, claim 3, line 23, "nonmodula" should read --nonmodulo--; claim 4, line 28, "nonmodula" should read --nonmodulo--. Column 13, claim 11, line 33, "$2(Q^{v-1})$" should read --$2(q^{v-1})$--; claim 13, line 57, "subsequent" should read --subsequence--. Column 14, claim 15, line 19, "$(p_i^{\alpha_i} - 1)$" should read --$(p_i^{\alpha_i-1})$--; line 21, "$(p_i^{\alpha_i} - 1)$" should read --$(p_i^{\alpha_i-1})$--; claim 16, line 33, "$2 \ \pi_{i=1}^{r} (p_i^{\alpha_i})$" should read

UNITED STATES PATENT AND TRADEMARK OFFICE
CERTIFICATE OF CORRECTION

PATENT NO. : 3,963,905
DATED : June 15, 1976
INVENTOR(S) : Bhaskarpillai Gopinath and Robert P. Kurshan It is certified that error appears in the above-identified patent and that said Letters Patent are hereby corrected as shown below:

$-- 2 \prod_{i=1}^{r} (p_i^{\alpha_i}) --$; line 41, "$(p_i^{\alpha_i} - 1)$" should read $--(p_i^{\alpha_i - 1})--$ line 43, "$(p_i^{\alpha_i} - 1)$" should read $--(p_i^{\alpha_i - 1})--$; line 48, "$(p_i^{\alpha_i} - 1)$" should read $--(p_1^{\alpha_1 - 1})--$; line 52, "$2(p_1^{\alpha_i} - 1)$"

should read $--2(p_1^{\alpha_1 - 1})--$; line 55, "$(p_1^{\alpha_i - 1})$" should read $--(p_1^{\alpha_1 - 1})--$.

Signed and Sealed this

Ninth Day of November 1976

[SEAL]

Attest:

RUTH C. MASON
Attesting Officer

C. MARSHALL DANN
Commissioner of Patents and Trademarks